United States Patent [19]

Harvey et al.

[11] Patent Number: 4,908,802
[45] Date of Patent: Mar. 13, 1990

[54] APPARATUS FOR FIBER OPTIC SEISMIC EXPLORATION SYSTEM

[75] Inventors: Donald W. Harvey, Sugarland; Bing-Fai Fung; Donald J. Bacha, both of Houston, all of Tex.

[73] Assignee: Geosource, Inc., Fort Worth, Tex.

[21] Appl. No.: 676,621

[22] Filed: Nov. 30, 1984

[51] Int. Cl.⁴ ............................................. G01V 1/22
[52] U.S. Cl. .................................. 367/149; 367/149; 455/601; 375/4
[58] Field of Search .................. 367/76, 149; 455/601; 375/4, 3; 350/96, 23

[56] References Cited

U.S. PATENT DOCUMENTS

| | | | |
|---|---|---|---|
| 3,973,240 | 8/1976 | Fong | 375/10 |
| 4,019,048 | 4/1977 | Maione et al. | 455/601 |
| 4,072,923 | 2/1978 | Siems et al. | 367/78 |
| 4,090,067 | 5/1978 | Bell et al. | 455/601 |
| 4,360,729 | 11/1982 | Harvey et al. | 367/79 |
| 4,408,307 | 10/1983 | Harris | 455/601 |

OTHER PUBLICATIONS

MDS-14 Operator's Manual—RTU; pp. 2-2 and 2-21 through 2-24.
MDS-14 Maintenance Manual—RTU; pp. RTUO-1, RTUO-2 & drawings.
MDS-16 Operator's Manual—RTU-II; pp. 1-9; 3-1 through 3-13.
MDS-16 Maintenance Manual—RTU-II.

Primary Examiner—Thomas H. Tarcza
Assistant Examiner—Ian J. Lobo
Attorney, Agent, or Firm—Andrew J. Dillon

[57] ABSTRACT

A two-port fiber optic repeater includes means for receiving and restoring command word signals and means for receiving and restoring return data signals. A periodically actuated power supply supplies power to circuitry for sensing valid signal inputs to the repeater. When valid signal inputs are sensed, a main power supply is enabled to supply constant power to signal restoration circuitry. The pulse width of the command word signals are adjusted. The return data signals are restored using a fixed-frequency oscillator and a counter.

2 Claims, 9 Drawing Sheets

* SIGNALS EXIT ONLY WITH DUAL LINK

APPARATUS FOR FIBER OPTIC SEISMIC EXPLORATION SYSTEM

BACKGROUND OF THE INVENTION

1. Field of the Invention

The present invention relates to seismic exploration, and, more particularly, to apparatus for use in a distributed seismic exploration system employing fiber optics as the medium of communication between remote units in such system.

2. Description of the Prior Art

In seismic exploration, sound waves are commonly used to probe the earth's crust as a means of determining the type and location of subsurface formations. The earth's crust can be considered a transmission medium or filter whose characteristics are to be determined by passing sound waves through that medium. In the reflection seismic method, sound waves or impulses are generated at a transmission point at or near the earth's surface, and sound waves reflected from subsurface reflecting boundaries are received at one or more receiving points. The received waves are detected and recorded in a form which permits analysis. Skilled interpreters can discern from such an analysis the shape and depth of subsurface reflection boundaries and the likelihood of finding accumulations of minerals, such as oil and gas.

In seismic exploration, seismic detectors, e.g., geophones, are arranged in arrays or nests at spaced intervals on the earth's surface, and generate electrical signals responsive to the reflected portion of the sound waves. By well known techniques, those electrical signals may be conveyed via cables to a location where they are recorded.

In recent years, the seismic industry has begun to use distributed systems for data acquisition. A typical distributed system may, for example, comprise a number of remote units which are located at spaced intervals on the earth's surface. Such remote units receive inputs from a plurality, e.g., eight, geophone arrays. Typically, such remote units operate to filter, amplify, and digitize the analog signals which are received from the geophone arrays. The remote units are serially connected to each other and to a central controller unit via an appropriate communication medium. Upon receipt of appropriate command word signals from the central controller unit, a remote unit will transmit the digitized seismic data to the central controller for storage and further processing.

One type of communication medium which has been utilized in distributed seismic exploration systems is a fiber optic cable. Examples of such distributed seismic exploration systems which have used fiber optic cables are the MDS-14 and MDS-16 systems, which are available from Geosource Inc., the assignee of the present application. One advantage of utilizing a fiber optic transmission medium in remote seismic telemetry systems is its relatively light weight, as compared to other communication media.

Problems have, however, existed in fiber optic distributed systems with respect to fiber optic cable lengths. As indicated above, in a typical distributed system, the seismic sensors are distributed in a linear pattern along the earth's surface. Depending upon the topography and objectives of the seismic survey, such sensors arrays may vary in length of surface coverage from over 440 ft. to below 25 ft. In a typical distributed system with eight sensors arrays connected to a remote processing unit, the separation between remote units may be as great as 8×440 ft. or approximately 3520 ft., thus requiring a fiber optic cables of that length between adjacent remote units. As will be readily appreciated, some difficulty has arisen with respect to the management and handling of such lengths of fiber optic cable. This problem has been solved by the apparatus of the present invention.

SUMMARY OF THE INVENTION

In accordance with the present invention, a repeater is provided for connection in a fiber optic cable communication link. The repeater operates to recover a distorted signal and to retransmit the signal on the fiber optic link. One or more repeaters may be connected in a fiber optic communication link between adjacent remote units in a seismic data telemetry system. In a preferred embodiment, a repeater in accordance with the present invention operates to automatically select the proper command word and return data paths between adjacent remote units.

In the preferred embodiment, a repeater in accordance with the present invention will not power up until both inputs of the repeater are connected to fiber optic links having optical transceivers at each end. Additionally, a repeater in accordance with the present invention minimizes power consumption through the utilization of a wake-up circuit, which periodically provides power to the repeater to determine the presence of signals on the fiber optic cable. When such signals are detected, the repeater is supplied full power to permit signal reception and retransmission.

A repeater in accordance with the present invention operates to provide a minimal restoration to command words from the central control unit to a remote unit and operates to provide full digital bit restoration to data signals which are returned from the remote unit to the central control unit.

These and other advantages of a repeater in accordance with the present invention will be appreciated from the following detailed description.

DESCRIPTION OF SPECIFIC EMBODIMENTS

It will be appreciated that the present invention can take many forms and embodiments. Some embodiments of the invention are illustrated herein for purposes of understanding the invention. The embodiments shown herein are intended to illustrate, and not to limit, the invention.

Figure 1:
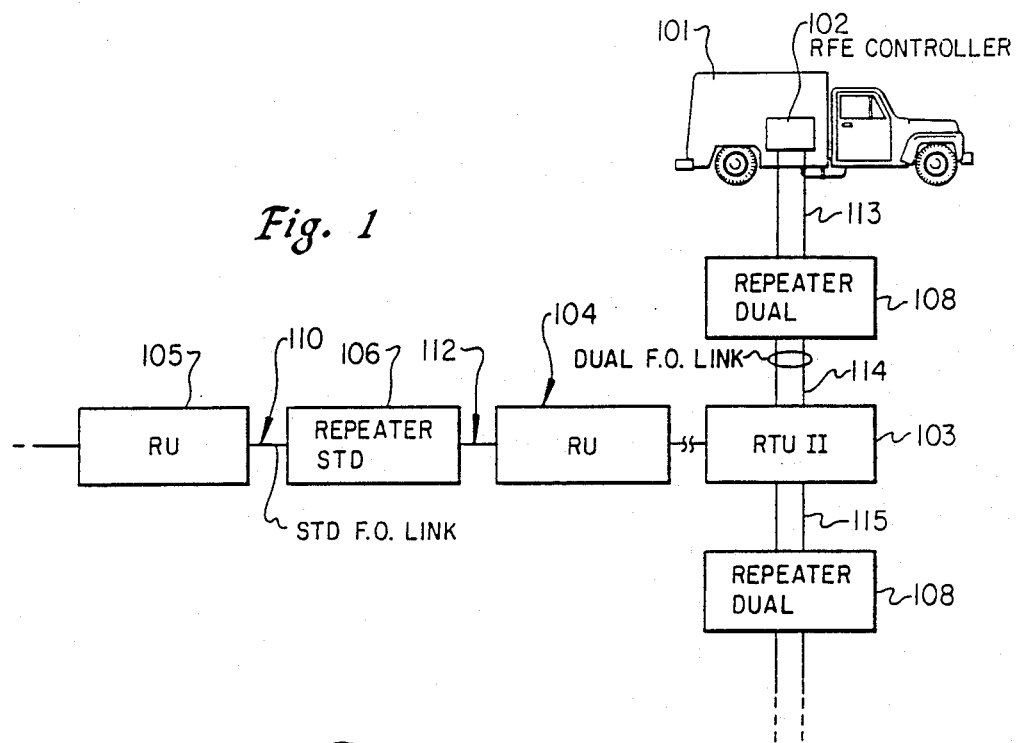
FIG. 1 is a block diagram which illustrates a configuration of a distributed seismic exploration system and the utilization of repeater therein in accordance with the present invention.

With reference now to FIG. 1, a distributed seismic exploration system which utilizes a fiber optic communication medium typically includes a recording vehicle 101 having a controller 102, a recorder takeout unit (RTU) 103 and a plurality of remote units 104 and 105, which are located on the same side of RTU 103 in FIG. 1. One skilled in the art will appreciate that a typical distributed system will also have remote units connected to the other side of RTU 103. In such a system, all remote units, e.g., 104 and 105, on one side of RTU 103 are serially connected by fiber optic communication links. RTU 103 and the controller 102 in vehicle 101 are also connected by a fiber optic link. As noted above, the length of the fiber optic communication medium between remote units 104 and 105 can be on the order of 3500 feet.

A repeater 106 in accordance with the present invention is provided for connection between adjacent remote units such as 104 and 105. Fiber optic cable 110 interconnects remote units 105 and repeater 106, while fiber optic cable 112 interconnects repeater 106 and remote unit 104. A repeater in accordance with the present invention may also be installed between RTU 103 and controller 102, such as illustrated by repeater 108 in FIG. 1.

Figure 2:
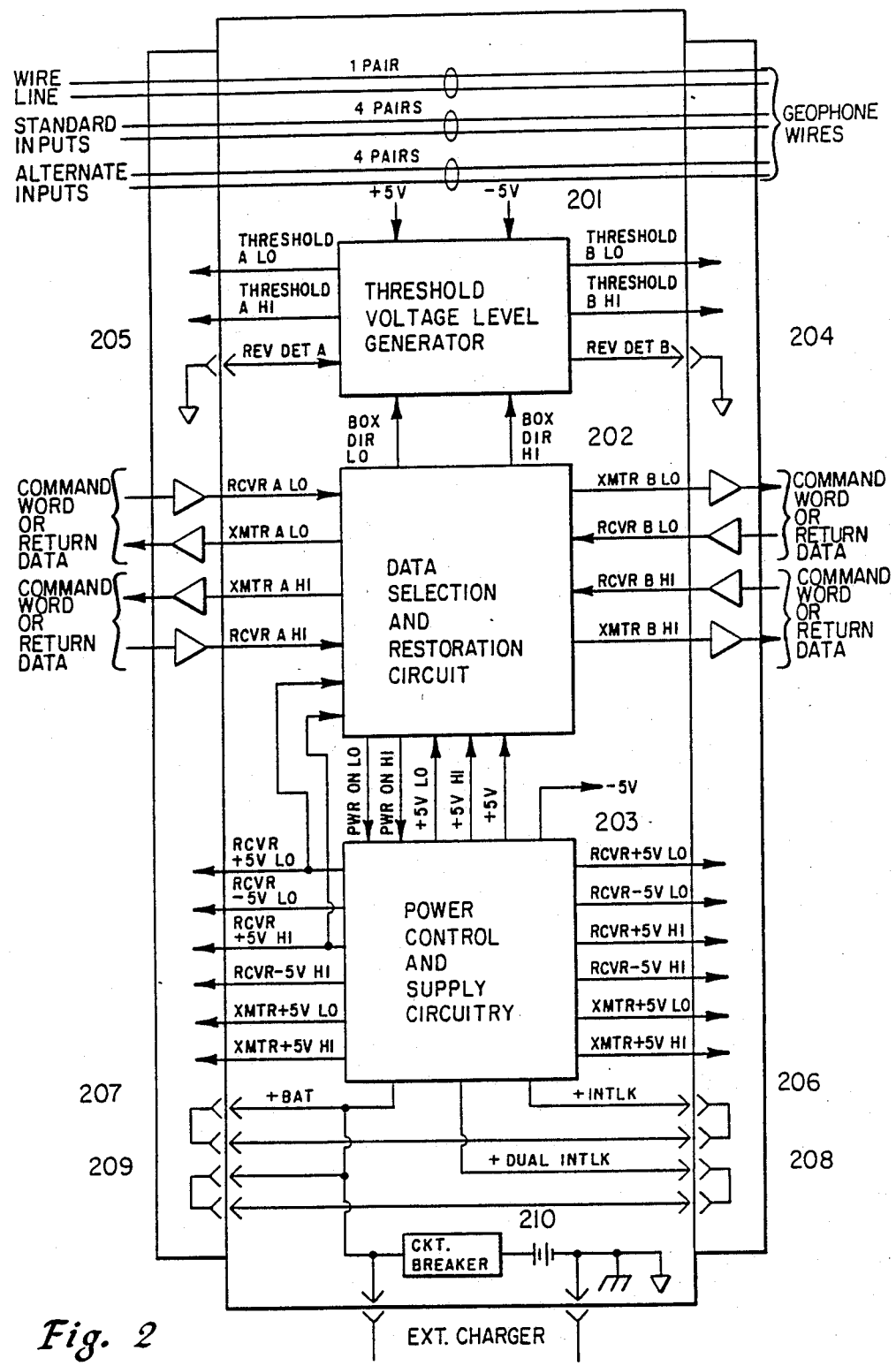
FIG. 2 is a block diagram which illustrates one configuration of a repeater in accordance with the present invention.

With reference now to FIG. 2, there is shown a block diagram of a presently preferred embodiment of the repeater 106. As shown, that embodiment of the repeater 106 comprises threshold voltage level generators 201, data selection and restoration circuit 202, and power control and supply circuitry 203. Data selection and restoration circuit 202 operates to detect the presence of a command word from the controller 102; to orient the repeater depending upon which connector the command word signals are received, and to restore command word signals and return data signals. Power control and supply circuitry 203 operates to generate a periodic wake up signal and to supply power to the repeater upon detection of command word signals. Threshold voltage level generator 201 operates to provide voltages which can be used in the restoration of command word signals from the central controller to a remote unit.

Referring to both FIGS. 1 and 2, the repeater 106 has first and second connectors, and each end of fiber optic cable 112 is terminated in a connector such as 204, 205, which mate with the connectors in the repeater 106. Each connector 204, 205 includes optical transceivers such as disclosed in U.S. Pat. No. 4,360,729, which is incorporated herein by reference. The optical transceiver in each connector 204, 205 operates to convert optical signals to electrical signals and vice versa. In a preferred embodiment, each connector 204, 205 includes the female portion of a connector, and repeater 106 includes a corresponding male portion of the same connector. The connectors on repeater 106 are designated "A" and "B", and the fiber optic cables may be connected to the repeater without regard to which cable is connected to connector A or connector B.

In accordance with the present invention, the repeater 106 will not operate unless both connectors 204, 205 are connected thereto. When the repeater is used in the standard mode between two adjacent remote units, jumpers 206 and 207 are included in the connectors 204 and 205, respectively. The jumpers 206 and 207 permit the signal designated +INTLK to assume a +12 volt level. As will be appreciated from FIG. 2, the signal +INTLK will not assume a +12 level unless both connectors 204 and 205 are connected to repeater 106.

When a repeater in accordance with the present invention is used as a dual repeater, such as repeater 108 in FIG. 1, jumpers 208 and 209 are included in connectors 204 and 205, respectively. Upon connection of both connectors 204 and 205 with jumpers 208 and 209, the signal +DUAL INTLK assumes a +12 volt level. The jumpers 208 and 209 are used in connectors 204 and 205 only when the repeater is used in the dual mode such as between RTU 103 and central controller 102 (FIG. 1).

Figure 3:
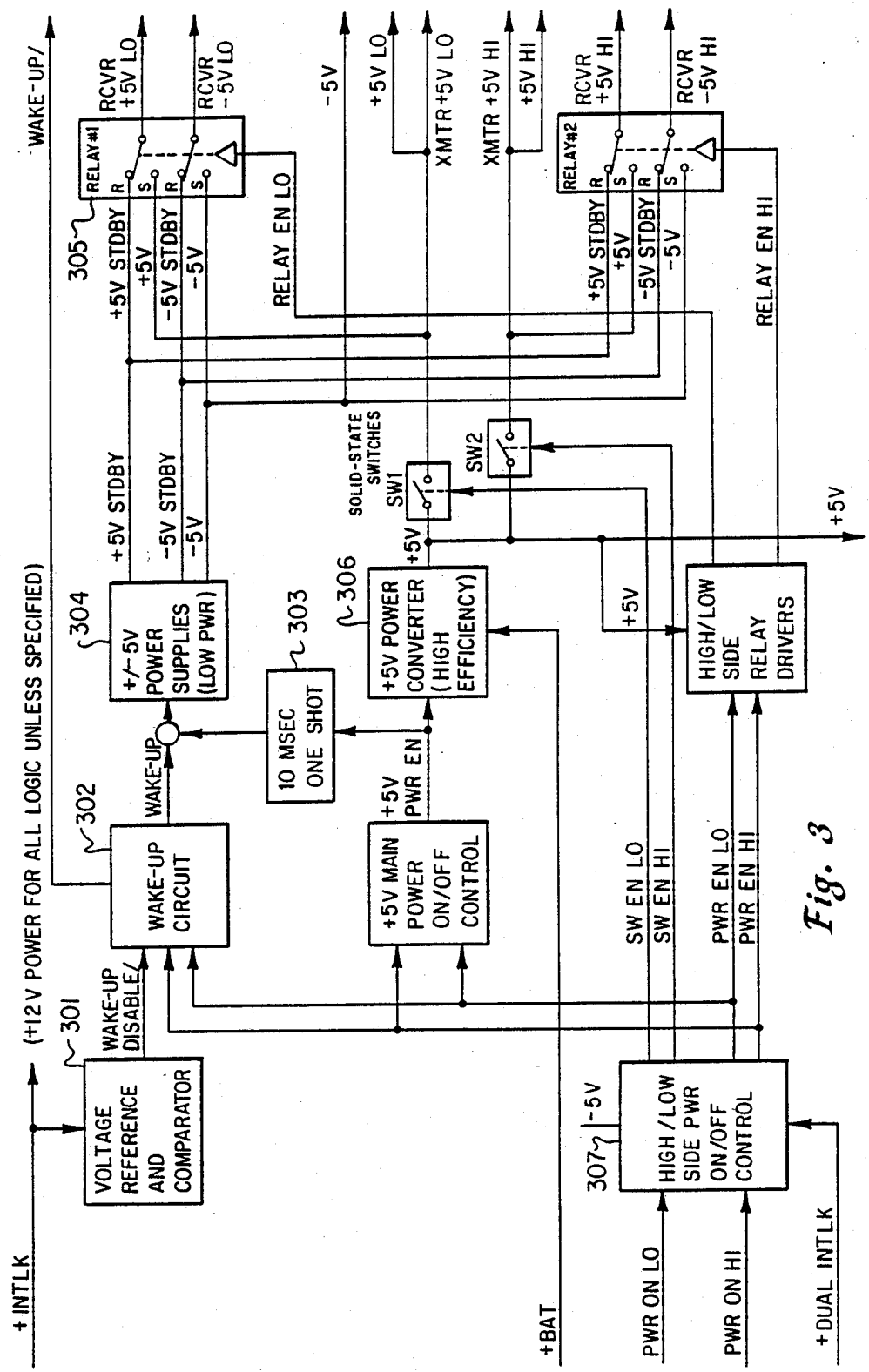
FIG. 3 is a block diagram which illustrates one configuration of the power control and supply circuitry of FIG. 2.

With reference to FIG. 3, there is illustrated in block diagram form the power control and supply circuitry 203 of FIG. 2. In the standard mode of operation, the level on +INTLK is the voltage of battery 210 (FIG. 2). Ideally, that voltage level on signal +INTLK is +12 volts. Voltage reference and comparator 301 operates to compare the level of the signal on +INTLK to a reference, and, if the battery level is below 11 volts, the repeater will not generate wake-up signals and will not power up. However, once the repeater is powered up, it will continue to remain powered up, even if the battery level drops to 10 volts or less.

Assuming the level of signal +INTLK is above 11 volts, wake-up circuit 302 is enabled and periodically generates a wake-up signal to power supply 304. Preferably, such wake-up signal is active for a 10 millisecond portion of each 0.25 second. The periodic wake-up signal activates power supply 304 to produce the periodic power signals designated +5 V STDBY and −5 V STDBY. Those signals are passed to and appear at the outputs of relay 305, which outputs are designated RCVR +5 V LO and RCVR −5 V LO.

A repeater in accordance with the present invention also includes circuitry for detecting the presence of command word signals during the wake-up interval. That circuitry is described in more detail below. If command word signals are detected during the wake-up interval, then power supply 306, which is the main power supply for the repeater, is activated, and the +5 V portion of power supply 304 is deactivated. One shot 303 operates to provide an additional ten milliseconds on time for power supply 304 when the presence of command word signals is detected, thereby providing sufficient time for power supply 306 to achieve substantially full output voltage before the +5 V portion of power supply 304 is turned off. Power supply 306, when activated, supplies the indicated power signals (+5 V) to the repeater. Power supply 304 continues to supply −5 V to the repeater.

Figure 5:
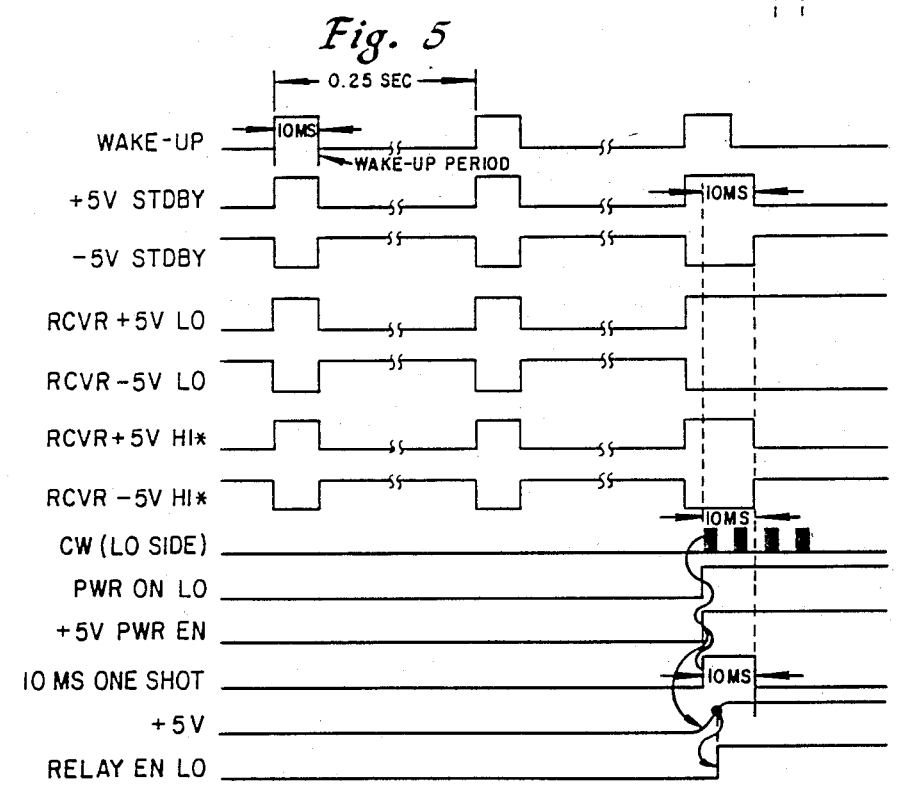
FIG. 5 is a timing diagram which illustrates the timing of the wake-up signal and the signals produced responsive thereto in a preferred embodiment of the repeated of the present invention.

With reference now to FIG. 5, there is illustrated a timing diagram for the wake-up signal, the additional signals which are activated by the wake-up signal, and signals which are activated upon the detection of command word signals during a wake-up interval. The timing diagram of FIG. 5 should be referenced in connection with the following description.

Figure 4:
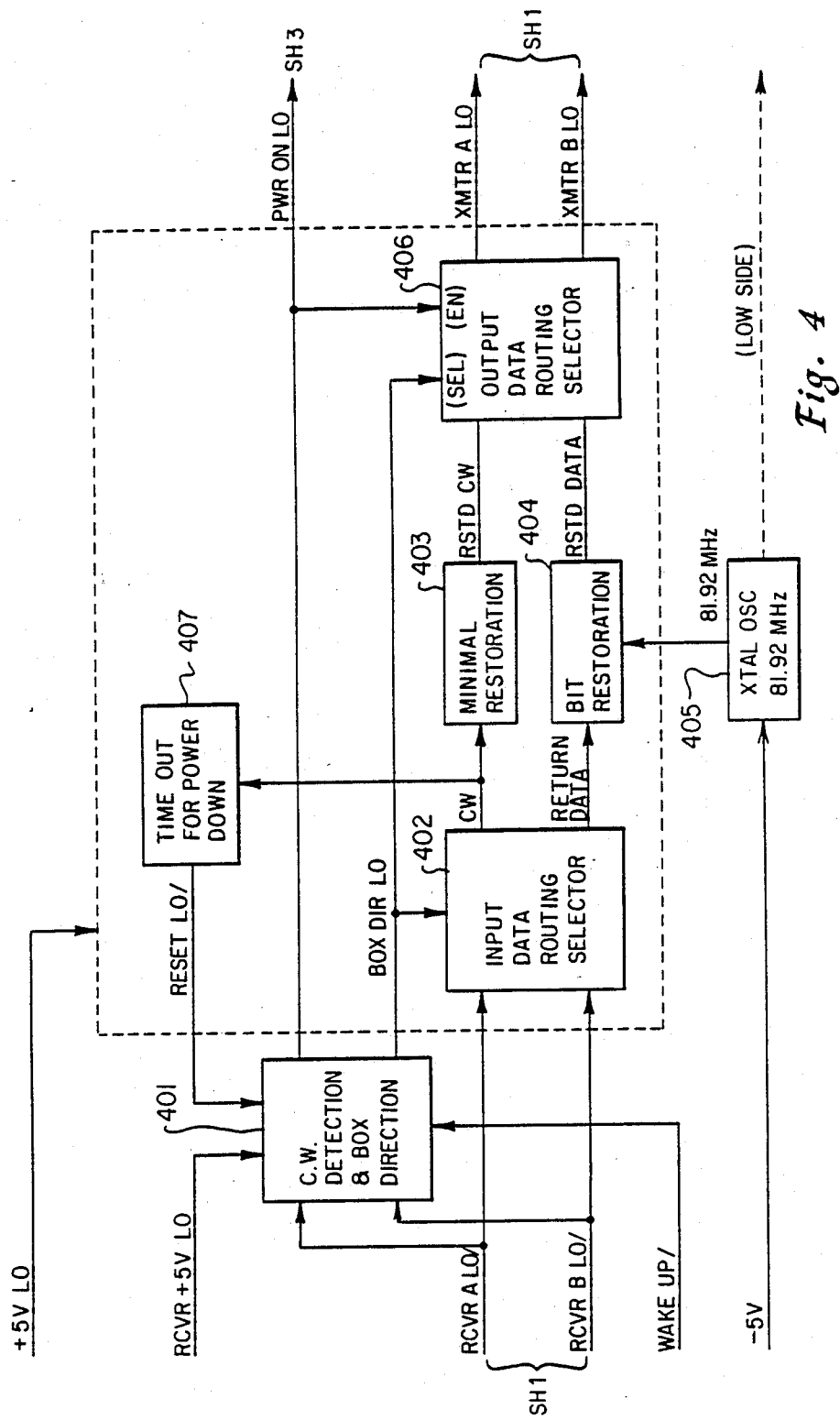
FIG. 4 is a block diagram which illustrates one configuration of the data selection and restoration circuitry of FIG. 2.

With reference now to FIG. 4, there is illustrated in block diagram form a portion of the data selection and restoration circuitry 202 of FIG. 2. A preferred embodiment of a repeater in accordance with the present invention has both "low" and "high" circuits. Remote units on one side of an RTU are designated as the high side, while remote units on the other side of an RTU are designated as the low side. When a repeater in accordance with the present invention is used in a fiber optic communication link between adjacent remote units as shown in FIG. 1, all communications are on the "low" side of the repeater. When a repeater in accordance with the present invention is utilized for communication between an RTU 103 and central controller 102 as shown in FIG. 1, both the low and high side circuitry are utilized. The circuitry illustrated in FIG. 4 for the low side of data selection and restoration circuit 203 is identical for both the low and high sides of the repeater.

Still with reference to both FIGS. 3 and 4, when the wake-up circuit 302 generates a wake-up signal, the signal RCVR +5 V LO at the output of relay 305 is fed to command word detection and box direction circuit 401. If command word signals are received on either input RCVR A LO/ or RCVR B LO/, command word detection and box direction circuitry 401 operates to activate the signal designated PWR ON LO. That signal is utilized by high/low side power on/off control circuitry 307 to activate the main power supply 306 of the repeater. In other words, the activation of the signal PWR ON LO indicates that command word signals have been detected during the wake-up interval.

Command word detection and box direction circuit 401 (FIG. 4) also operates to generate the signal BOX DIR LO, the active state of which indicates whether data has been received on the A connector or B connector of the repeater. In a preferred embodiment, a logic zero state for the signal BOX DIR LO indicates that command word data has been received on the A connector of the repeater, and a logic one level for that signal indicates that command word data has been received on the B connector of the repeater.

A preferred embodiment of the repeater of the present invention includes minimal restoration circuit 403 and full bit restoration circuit 404. Input data routing selector 402 operates, based on the logic state of the signal BOX DIR LO, to determine if the input signals are command words or return data and to route the signals based on that determination. In that preferred embodiment, minimal restoration is applied to command word signals, while full bit restoration is provided to the return data signals. Depending upon the logic state of the signal BOX DIR LO, the restored signals are fed out on the lines XMTR B LO or XMTR A LO. If command word signals are received on the A connector, they are retransmitted out of the repeater on the B connector, and vice versa. In a preferred embodiment, a crystal oscillator 405 is utilized in the implementation of the full bit restoration of return data, and, preferably has a frequency of 81.92 MHz.

Power down circuitry 407 operates to cause the repeater 106 to power down, if command word signals are not received by the repeater for a predetermined period of time. In a preferred embodiment of the present invention, that predetermined period of time is one second.

The remaining portion of the specification describes the circuitry set forth in FIGS. 6-9, which illustrate in detail a presently preferred implementation of a repeater in accordance with the present invention. In the accompanying drawings, part numbers and values of components are set forth, which components and parts are commercially available at the present time from commercial vendors.

Figure 6:
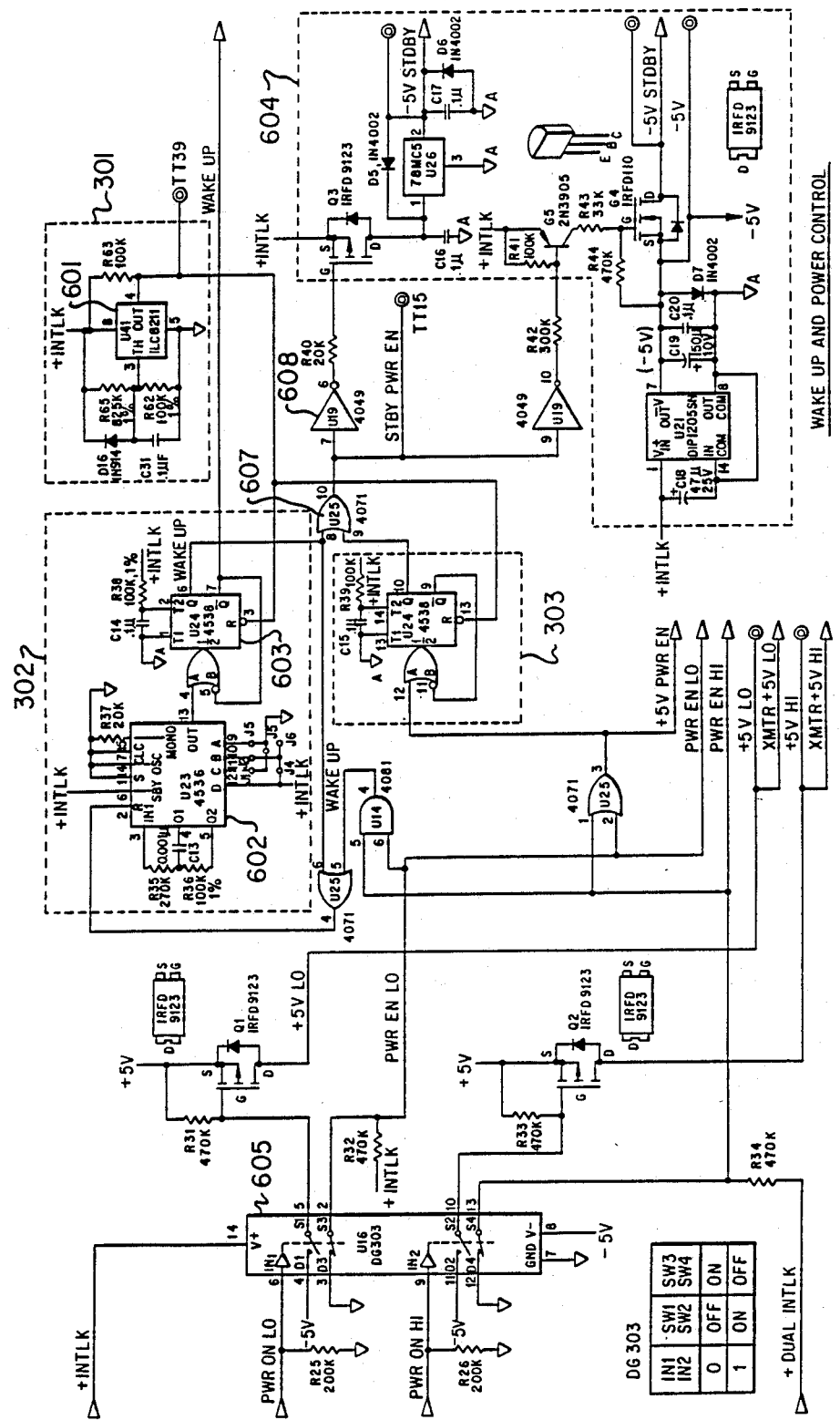
FIG. 6 is a detailed schematic drawing which illustrates a preferred implementation of the wake-up and power control circuitry in a repeater according to the present invention.

With reference first to FIG. 6, there is illustrated a preferred implementation of voltage reference and comparator 301 (FIG. 3). If +INTLK is above 11 volts, the output of voltage sensor 601 produces a logic 1 (+12 V) output, which enables wake-up circuitry 302 to generate a periodic wake-up signal. If the signal +INTLK is below 11 volts, voltage sensor 601 will not permit the wake-up circuitry 302 to operate.

Figure 9:
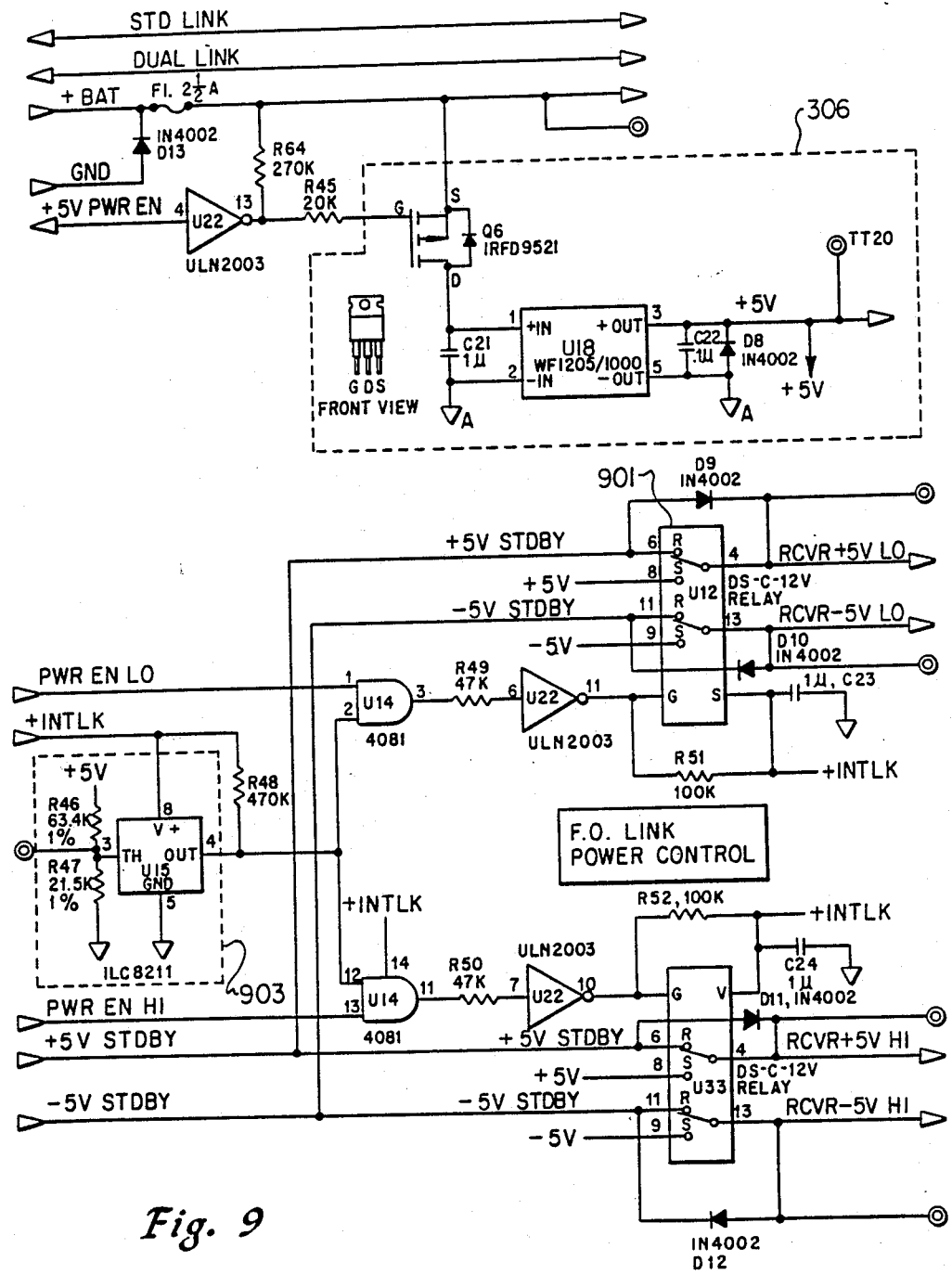
FIG. 9 is a detailed schematic diagram which illustrates a preferred implementation of the power supply and power control circuitry which is utilized in a preferred embodiment of the present invention.

With reference still to FIG. 6, programmable timer 602 is programmed to produce an output pulse every 0.25 seconds. That output of programmable timer 602 triggers one shot 603, which generates the signal WAKE UP at its output. The signal WAKE-UP is fed via OR gate 607 and inverter 608 to activate power supply 604. Preferably, the active state of the output of one-shot 603 is 10 milliseconds in duration. Power supply 604, when activated, produces the signal +5 V STDBY at its output, which signal is fed to relay 901 (FIG. 9). The signal +5 V STDBY is thus initially active for 10 milliseconds.

The output of relay 901 (FIG. 9) is the signal designated RCVR +5 V LO which is fed to the command word detection circuitry shown in FIG. 7. If the presence of a command word is detected during the wake-up interval, the output of flip-flop 701, which is designated PWR ON LO assumes a logic one state. PWR ON LO is fed to analog switch 605 which causes the signal PWR EN LO to assume a logic level equal to approximately +12 volts. The signal +5 V PWR EN is then activated which is fed to turn on the main five volt power supply which is designated 306 in FIG. 9. The output of power supply 306 (FIG. 9) is designated +5 V and is fed among other places to relay 901.

With reference to FIG. 6, a preferred implementation of one shot 303 is illustrated. The signal +5 V PWR EN also feeds one shot 303, whose output signal is fed via OR gate 607 and inverter 608 to power supply 604 to keep the standby power +5 V STDBY on for approximately an additional 10 milliseconds after command word signals have been detected during a wake-up interval.

Referring to FIG. 9, when the output voltage of power supply 902 reaches approximately 4.75 volts, voltage sensor 903 produces a true output signal which, together with PWR EN LO being true, causes relay signal 901 to switch from standby power, +5 V STDBY, to the output of power supply 902, +5 V, as the power source.

Figure 7A:
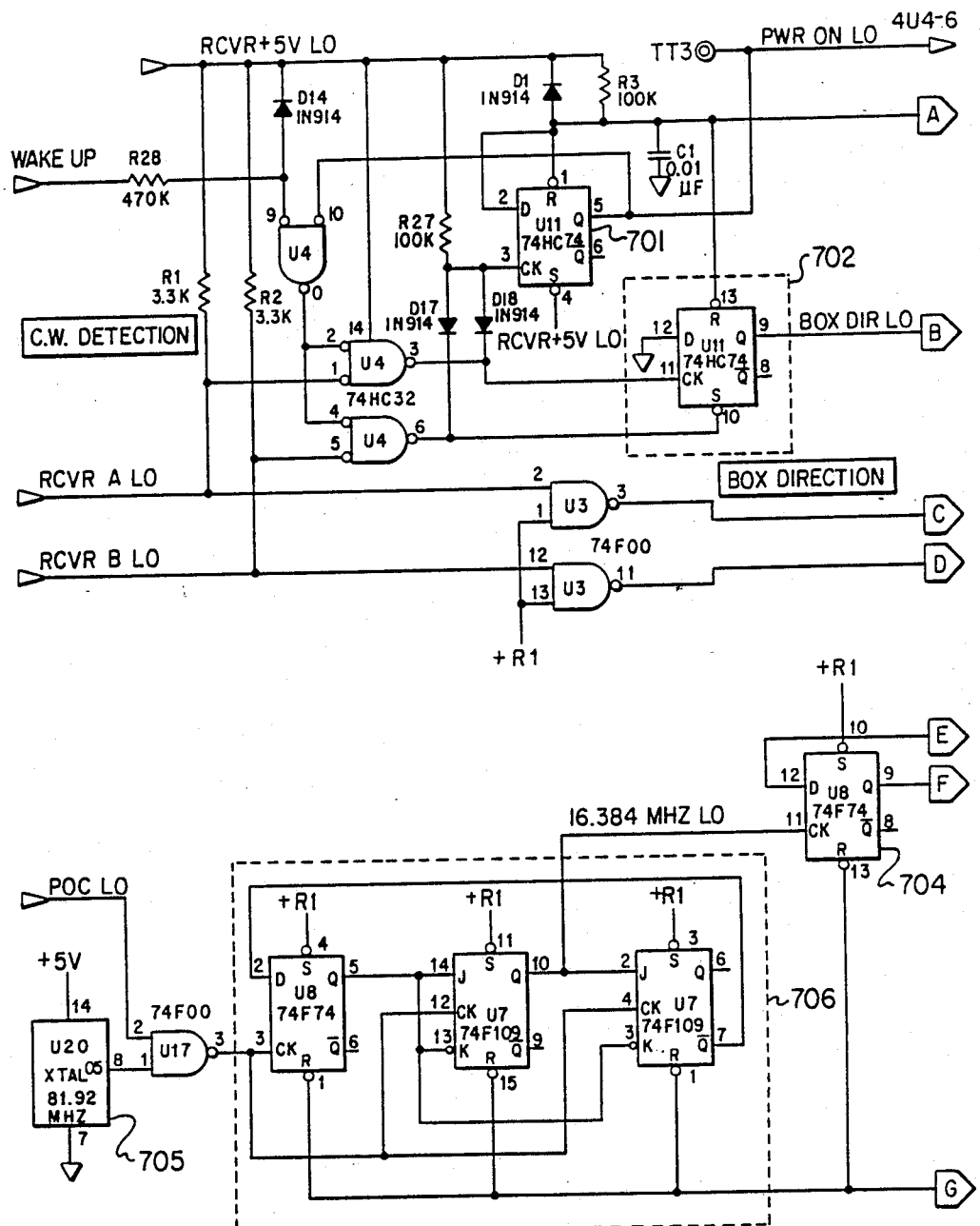
FIGS. 7A and 7B together form is a detailed schematic diagram which illustrates a preferred implementation of the command word detection circuitry, box direction detection circuitry, signal routing circuitry, full bit restoration circuitry and power down circuitry which is utilized in a preferred embodiment of the present invention.
Figure 7B:
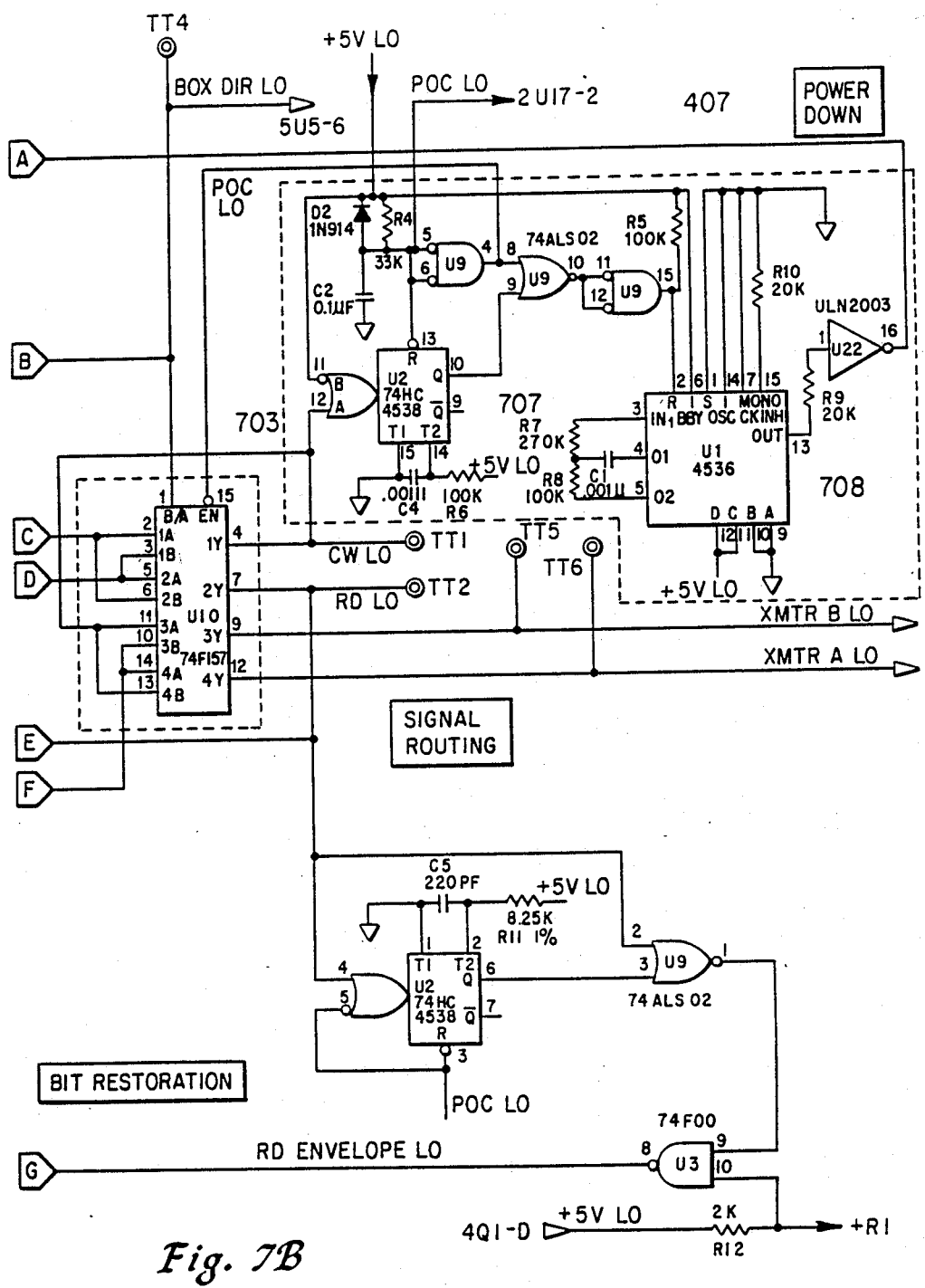

With reference now to FIGS. 7A and 7B, box direction flip-flop 702 operates to determine whether the command word was received on A or B connector of the repeater. If command word signals are received on the A connector, the output of box direction flip-flop 702, which output is designated BOX DIR LO, is in a logic zero state. On the other hand, if command word signals were received on B connector of the repeater, the signal BOX DIR LO will be set to a logic one state.

As noted above, a repeater in accordance with the present invention operates to apply a minimal restoration to command word signals from a central controller to a remote unit, while the repeater operates to provide full bit restoration to return data signals from a remote unit to the central controller. In one implementation of a distributed system offered by Geosource Inc., the assignee of the present application, command word signals are generated at a 2 MHz rate, while return data signals are generated at a 8 MHz rate.

Figure 8:
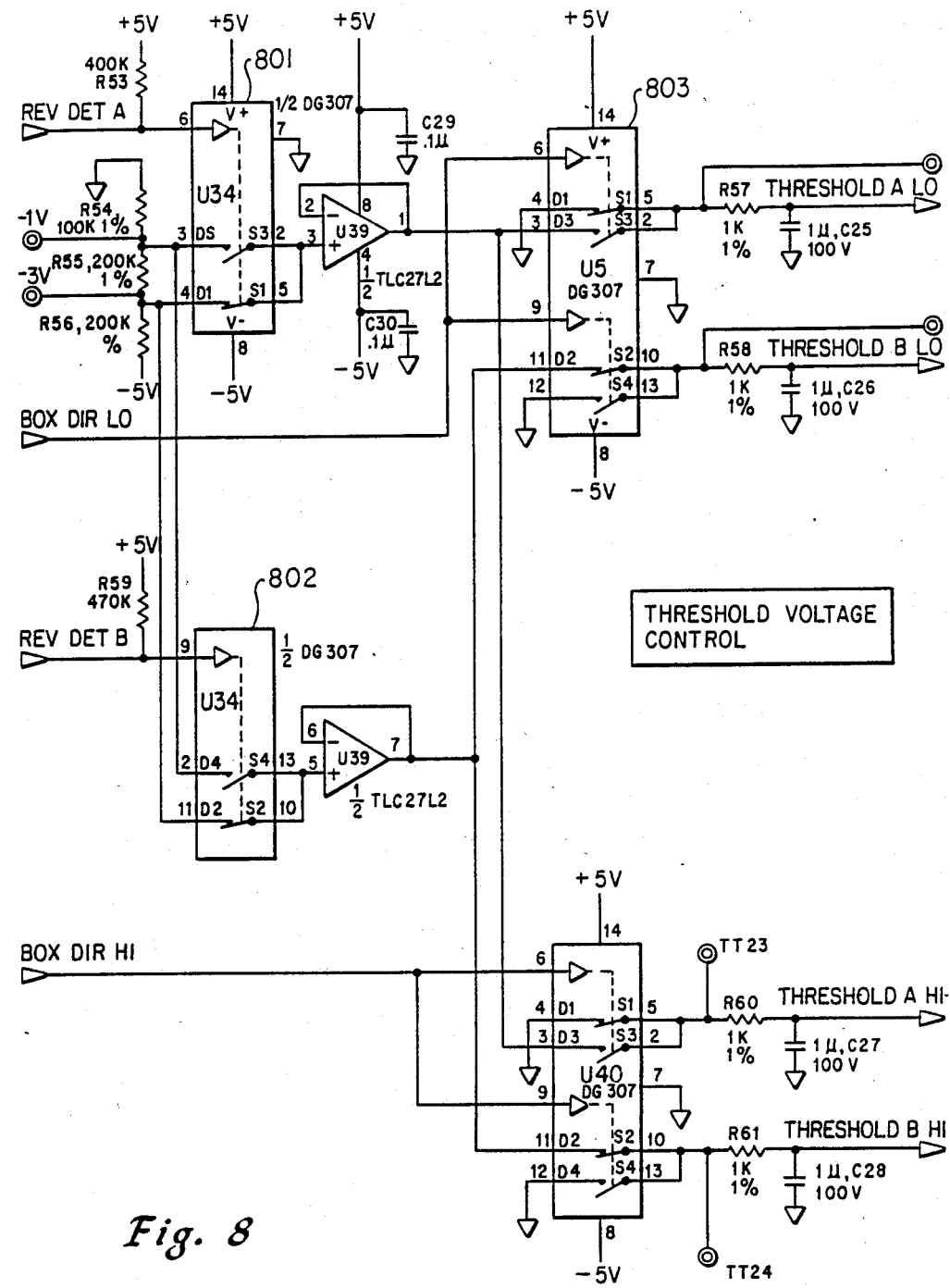
FIG. 8 is a detailed schematic diagram which illustrates a preferred implementation of the threshold voltage level generator of FIG. 2.

In accordance with th present invention, a feedback signal is generated by the repeater, which is used in the minimal restoration of command word signals as they are received. With reference to FIG. 8, there is illustrated a preferred implementation of the circuitry which generates that feedback signal.

It has been found that different types of fiber optic cables exhibit different transmission characteristics. In accordance with the present invention, either a −1 volt signal or a −3 volt signal is applied to the optical transceiver in the connector on which command word signals are detected. That feedback signal, either −1 volt or −3 volt, operates in conjunction with the comparator in the optical transceiver to determine the pulse width of the command word signals.

With reference now to both FIGS. 2 and 8, the −1 volt and −3 volt signals are generated as follows. Depending upon the type of fiber optic cable which is utilized, the signals REV DET A and REV DET B are either grounded or not grounded. If those signals are grounded, switches 801 and 802 select −1 volt to appear at each of their respective outputs. On the other hand, if the signals REV DET A and REV DET B are not grounded, switches 801 and 802 operate to select −3 volts to appear at their respective outputs.

With reference still to FIG. 8, if the signal BOX DIR LO is a logic zero, the command word signals are received on connector A and a feedback signal, either −1 volt or −3 volts is present at the output designated THRESHOLD A LO, and the output of switch 803 which is designated THRESHOLD B LO is 0 volts. If, on the other hand, command word signals are received on the B connector, the signal BOX DIR LO will assume a logic 1 state. In this condition, the output threshold A LO is 0 volts, while the output signal THRESHOLD B LO is either −1 or −3 volts.

If command word signals are received on the A connector, the feedback signal of −1 or −3 volts on threshold A LO is fed to a comparator in the optical transceiver in the A connector. This feedback voltage operates in conjunction with that comparator to provide minimal restoration of the command word. On the other hand, if command word signals are received on the B connector, the signal on threshold B LO is −1 or −3 volts which is fed to the comparator in the optical transceiver in connector B, and this feedback voltage operates in connection with the optical transceiver in connector B to provide minimal restoration to command word signals received on connector B.

Also illustrated in FIG. 8 is the preferred implementation of the circuitry for generating the feedback signals for the high side circuitry of a repeater in accordance with the present invention.

The output of box direction flip-flop 702 feeds data selector 703. One-half of data selector 703 implements input data routing selector 402, while the other half of data selector 703 implements output data routing selector 406 (FIG. 4). If command word signals are received on the A connector of the repeater, the restored command word signals are fed via input 1A of data selector 703 to output 1Y of a data selector 703. Output 1Y is fed to input 3A of data selector 703 and to the output 3Y of data selector 703 as the restored command word. Thus, command word signals which are received on the A connector of the repeater are retransmitted on the B connector of the repeater (XMTR B LO).

When command word signals which are received on the B connector of the repeater, the output of box direction flip-flop 702 is a logic one, and the command word signals would be routed via input 1B to output 1Y to input 4B to output 4Y of data selector 703.

Still referring to FIGS. 7A and 7B, if command word signals are received on the A connector of the repeater, return data signals from the remote units to the central controller are received on the B connector, i.e., RCVR B LO/. Those return data signals are routed via input 2A of data selector 703 to the 2Y output of data selector 703 and thence to the data input of flip-flop 704. The clock input to flip-flop 704 is preferably a 16.384 MHz signal, which is produced at the output of divide by 5 counter 706. The input signal to divide by 5 counter 706 is provided by crystal oscillator 705, which preferably has a frequency of 81.92 MHz. The output of flip-flop 704 follows the return data input and is fed to data selector 703. The return data signals which appear on the B input are fully restored by use of data selector 703, flip-flop 704, crystal oscillator 705 and divide by 5 counter 706.

With reference again to FIGS. 7A and 7B, a preferred implementation of power down circuitry 407 (FIG. 4) is illustrated. When command word signals appear at the output of data selector 703, those signals trigger one shot 707 in power down circuitry 407. The output of one shot 707 drives programmable timer 708. If command word signals are not received for a predetermined period of time, the output of programmable timer 708 generates an active low signal which resets flip-flop 701, thereby bringing the signal PWR ON LO to a logic 0 and powering down the repeater. In a preferred embodiment of the present invention, if command word signals are not received for one second, the repeater is powered down. When PWR ON LO is brought to a logic 0 state, the main power supply of the repeater 306 (FIGS. 3 and 9) is disabled.

What is claimed is:

1. Apparatus for communicating signals between, a first and a second adjacent remote units in a distributed seismic exploration system, said system including a controller for generating command word signals to one or more of the remote units, said apparatus comprising:
a first connector for connection to a first fiber optic communication link;
a second connector for connection to a second fiber optic communication link;
means for detecting whether command word signals are received at said first connector or said second connector;
means for restoring said received command word signals and for coupling said restored command word signals to said second connector n response to reception of said command word signals at said first connector and for coupling said restored command word signals to said first connector in response to reception of said command word signals at said second connector;

first circuit means for generating an activating signal at predetermined intervals;

a first power source responsive to said activating signal for generating a constant voltage;

second circuit means responsive to said constant voltage for detecting the receipt of command word signals; and means for activating a second power source of said apparatus in response to the receipt of command word signals and deactivating said first power source, after said second power source has achieved substantially full output voltage.

2. Apparatus for communicating signals between a first and a second adjacent remote units in a distributed seismic exploration system, said system including a controller for generating command word signals to one or more of the remote units and for receiving returned data signals from one or more remote units, said apparatus comprising:

a first connector for connection to a first fiber optic communication link;

a second connector for connection to a second fiber optic communication link;

means for detecting whether command word signals are received at said first connector or said second connector;

means for restoring said received command word signals and for coupling said restored command word signals to said second connector in response to reception of said command word signals at said first connector and for coupling said restored command word signals to said first connector in response to reception of said command word signals at said second connector;

means for detecting whether or not return data signals are received at said first connector or said second connector;

means for restoring said received return data signals and for coupling said restored return data signals to said second connector in response to reception of said return data signals at said first connector and for coupling said return data signals to said first connector in response to reception of said return data signals at said second connector;

first circuit means for generating an activating signal at predetermined intervals;

a first power source responsive to said activating signal for generating a constant voltage;

second circuit means responsive to said constant voltage for detecting the receipt of command word signals; and means for activating a second power source of said apparatus in response to the receipt of command word signals and deactivating said first power source, after said second power source has achieved substantially full output voltage.

* * * * *

UNITED STATES PATENT AND TRADEMARK OFFICE
CERTIFICATE OF CORRECTION

PATENT NO. : 4,908,802
DATED : March 13, 1990
INVENTOR(S) : Donald W. Harvey et al It is certified that error appears in the above-identified patent and that said Letters Patent is hereby corrected as shown below:

In column 2, line 64, delete [repeated] and insert therefore --repeater--.

In column 7, line 15, delete [th] and insert therefore --the--.

In column 8, line 67, delete [n] and insert therefore --in--.

Signed and Sealed this

Eleventh Day of February, 1992

*Attest:*

HARRY F. MANBECK, JR.

*Attesting Officer*      *Commissioner of Patents and Trademarks*